United States Patent [19]

Claassen et al.

[11] Patent Number: 4,488,893
[45] Date of Patent: Dec. 18, 1984

[54] MOVABLE ALIGNMENT STOPS FOR GLASS SHEET SHAPING APPARATUS

[75] Inventors: George B. Claassen, New Kensington; Rudolph A. Karlo, Creighton; William B. Zimmerman, Russellton, all of Pa.

[73] Assignee: PPG Industries, Inc., Pittsburgh, Pa.

[21] Appl. No.: 521,478

[22] Filed: Aug. 8, 1983

[51] Int. Cl.³ .......................................... C03B 23/025
[52] U.S. Cl. ........................................ 65/287; 65/106; 65/273
[58] Field of Search ................ 65/104, 106, 107, 273, 65/287

[56] References Cited

U.S. PATENT DOCUMENTS

| 3,265,484 | 8/1966 | Ritter, Jr. | 65/104 |
| 3,315,774 | 8/1967 | Leflet, Jr. | 193/37 |
| 3,338,695 | 8/1967 | Ritter, Jr. | 65/104 |
| 3,361,552 | 1/1968 | Ritter, Jr. | 65/106 |
| 3,459,526 | 8/1969 | Stickel et al. | 65/289 |
| 3,468,645 | 9/1969 | McMaster et al. | 65/25 |
| 3,476,541 | 11/1969 | Ritter, Jr. | 65/268 |
| 3,476,542 | 11/1969 | Ritter, Jr. | 65/268 |
| 3,485,615 | 12/1969 | Rahrig et al. | 65/181 |
| 3,485,618 | 12/1969 | Ritter, Jr. | 65/273 |
| 3,488,178 | 1/1970 | Welker et al. | 65/268 |
| 3,527,589 | 9/1970 | Ritter, Jr. | 65/289 |
| 3,554,724 | 1/1971 | Ritter, Jr. et al. | 65/107 |
| 3,563,721 | 2/1971 | Ritter, Jr. | 65/273 |
| 3,573,889 | 4/1971 | McMaster et al. | 65/62 |
| 3,615,338 | 10/1971 | Boyles | 65/291 |
| 3,676,098 | 7/1972 | Hall | 65/106 |
| 3,734,706 | 5/1973 | Ritter, Jr. | 65/104 |
| 3,905,794 | 9/1975 | Revells et al. | 65/106 |
| 3,960,535 | 6/1976 | Hamilton et al. | 65/104 |
| 4,043,782 | 8/1977 | Bamford et al. | 65/104 |
| 4,074,996 | 2/1978 | Hagedorn et al. | 65/106 |
| 4,119,427 | 10/1978 | Revells | 65/159 |
| 4,217,126 | 8/1980 | Hagedorn et al. | 65/106 |
| 4,229,200 | 10/1980 | Seymour | 65/106 |
| 4,252,552 | 2/1981 | Frank | 65/106 |
| 4,272,275 | 6/1981 | Reese | 65/273 |
| 4,282,026 | 8/1981 | McMaster et al. | 65/273 |
| 4,305,746 | 12/1981 | Hagedorn et al. | 65/106 |
| 4,312,661 | 1/1982 | Hagedorn et al. | 65/290 |

Primary Examiner—Arthur Kellogg
Attorney, Agent, or Firm—Andrew C. Siminerio; Edward I. Mates

[57] ABSTRACT

A ring-like member for use in lifting a glass sheet from a given path to the vicinity of a vacuum holder at a shaping station has its movement coordinated mechanically with stop means that engages the leading edge of a glass sheet at an edge locating position when said ring-like member is below said given path and mechanically retracts from said edge locating position in unison with said ring-like member when said ring-like member moves in the direction of the thickness of said glass sheet to engage and lift said glass sheet. This mechanical coordination of movements avoids rubbing the glass sheet edge in the direction of the glass sheet thickness during its lifting without requiring complicated and expensive coordinating equipment.

7 Claims, 3 Drawing Figures

MOVABLE ALIGNMENT STOPS FOR GLASS SHEET SHAPING APPARATUS

BACKGROUND OF THE INVENTION

1. Field of the Invention

The present invention relates to the shaping of sheets of thermoplastic material, most particularly, those of glass. Many techniques for shaping glass sheets are known. Perhaps the simplest technique involves heating a glass sheet while supported on a contoured mold of outline configuration and to permit the sheet to sag by gravity as it is heated so that it conforms to the outline shape of the mold.

It often is desirable to speed the shaping process by applying a mechanical bending force such as by sandwiching the glass sheets in pressurized engagement between a pair of contoured shaping molds. For such shaping, glass sheets are sometimes suspended by tongs and at other times are supported in a horizontal plane.

2. Technical Background And Description Of Patents Of Interest

When glass sheets are shaped after being conveyed into a shaping station, the position and alignment of the glass sheet with respect to the shaping molds is very important. Consequently stop means have been used to align the position of the glass sheet relative to a pair of shaping molds so as to insure that the glass sheet is shaped into the desired contour. However, if a glass sheet that engages stop means to be properly aligned between a pair of shaping molds is permitted to have its edge scrape against the stop member when a shaping mold moves the glass sheet in the direction of the glass sheet thickness to shape the sheet, the edge is liable to become distorted. The distorted edge makes it difficult to install the shaped glass sheet within a frame designed to receive the glass sheet of a desired configuration.

It has been the custom in the past to provide means that move stop means into glass edge engaging position to insure that each glass sheet arrives at a position of proper alignment within the shaping station and that retract the stop means from engagement with the glass sheet edge before the heat softened glass sheet is moved in the direction of its thickness on one of the shaping molds. In the past, the stop means was actuated by electrically controlled actuation means and it was sometimes difficult to maintain proper timing to coordinate the movement of the stop means with the movement of the shaping molds.

Examples of patents that show independent actuation of stop means relative to the operation of shaping molds include U.S. Pat. Nos. 3,265,484 to Ritter, 3,315,774 to Leflet, 3,338,695 and 3,361,552 to Ritter, 3,459,526 to Stickel et al., 3,468,645 to McMaster et al., 3,476,541 and 3,476,542 to Ritter, 3,485,615 to Rahrig et al., 3,485,618 to Ritter, 3,488,178 to Welker et al., 3,527,589, 3,554,724 and 3,563,721 to Ritter, 3,573,889 to McMaster et al., 3,615,338 to Boyles, 3,676,098 to Hall, 3,734,706 to Ritter, 3,905,794 to Revells et al., 3,960,535 to Hamilton, 4,043,782 to Bamford, 4,074,996 to Hagedorn et al., 4,119,427 to Revells, and 4,217,126, 4,305,745 and 4,312,661 to Hagedorn et al.

The previous patents are all characterized by requiring some type of complicated timing mechanism to coordinate the movement of the stop means with the movement of the glass sheet into a shaping station. The last Hagedorn et al. U.S. Pat. No. 4,312,661 also discloses an articulated pressing mold having pivotal end sections and mechanical means interconnecting the end mold sections to coordinate their movements in unison.

U.S. Pat. No. 4,229,200 to Seymour discloses fixedly located stop members of a shape conforming to the leading edge of a glass sheet of non-rectangular outline that moves into a shaping station. The glass sheet is supported on a gaseous bed and is lifted by a vacuum holder or a lifting ring into engagement by a vacuum holder at a shaping station. Since the stop means are located in fixed position, although their positions may be adjusted and they may be replaced for different patterns, the glass sheet tends to scrape against the fixed stop members when it is lifted into engagement with the vacuum holder either by vertical movement of a vacuum holder engaging the upper surface of the glass sheet by vacuum or by a mechanical lifting ring that engages the lower surface of the glass sheet to bring it into engagement with the vacuum holder disposed above the portion of the gaseous bed that is beneath the vacuum holder.

U.S. Pat. No. 4,252,552 to Frank and U.S. Pat. No. 4,282,026 to McMaster et al disclose the use of sensors that detect the presence of a glass sheet and cooperate with timing circuits to coordinate the position of the glass sheet and the press shaping molds. Control circuits of this type are expensive and require high caliber personnel to maintain whenever things go wrong with such equipment.

U.S. Pat. No. 4,272,275 to Reese discloses gravity actuated members that engage glass edges in the vicinity of an outline mold. Support means temporarily support the glass edge engaging members to locate the upper edges of the glass edge engaging members in position to abut the edge of one or more glass sheets as the latter sag toward the outline mold and suddenly and automatically release their supporting force to remove the glass edge engaging members from the vicinity of the edge of the supported glass sheets just before the glass sheets are lifted from the outline mold and supported in sandwiched relation between an upwardly rising mold which is one of a pair of molds and an upper mold of complementary curvature to the lower shaping mold. While this invention mechanically coordinates the termination of the edge engagement with the lifting of a glass sheet off an outline mold, it is necessary to reset the supporting elements for the glass engaging members before each time a glass sheet is loaded onto a mold of outline configuration provided with this type of glass edge engaging members.

It would be desirable for the glass sheet shaping art to develop glass edge engaging members that need not be reset manually between shaping operations, particularly in the type of glass sheet bending operation depicted in U.S. Pat. Nos. 4,229,200 to Seymour or 4,252,552 to Frank or 4,282,026 to McMaster et al.

BRIEF DESCRIPTION OF THE PRESENT INVENTION

The present invention provides a method for aligning and lifting a glass sheet at a shaping station having means defining a support surface along a longitudinal path at a desired position in said shaping station, a ring-like member adapted for movement between a lowered position below said support surface and a raised position above said support surface and stop means mechanically arranged with respect to said ring-like member to automatically move into a glass edge engaging location at said desired position when the ring-like member is located below the support surface and mechanically moves away from said desired glass edge engaging location when said ring-like member is raised, thereby lifting the glass sheet toward a vacuum holder which engages the glass sheet above said given path. Subsequently, the vacuum holder releases the glass sheet to drop it onto a ring-like tempering member which shuttles the shaped glass sheet from the shaping station to a cooling station. Instead of requiring complicated and expensive apparatus to coordinate the movement of the ring-like member with that of the stop means, the present invention provides a simple, mechanically operated, coordinating apparatus that avoids scraping the glass sheet edge in the direction of the glass sheet thickness when the sheet is lifted toward the vacuum holder and automatically returns the stop means to a desired glass edge locating position when the ring-like member resumes its lowered position to await the arrival of the next glass sheet to be shaped at the shaping station.

The benefits of the present invention over the prior art will be understood in the light of a description of a specific embodiment that follows.

DESCRIPTION OF THE DRAWINGS

In the drawings that form part of a description of an illustrative embodiment of the present invention.

DESCRIPTION OF SPECIFIC EMBODIMENT

Figure 1:
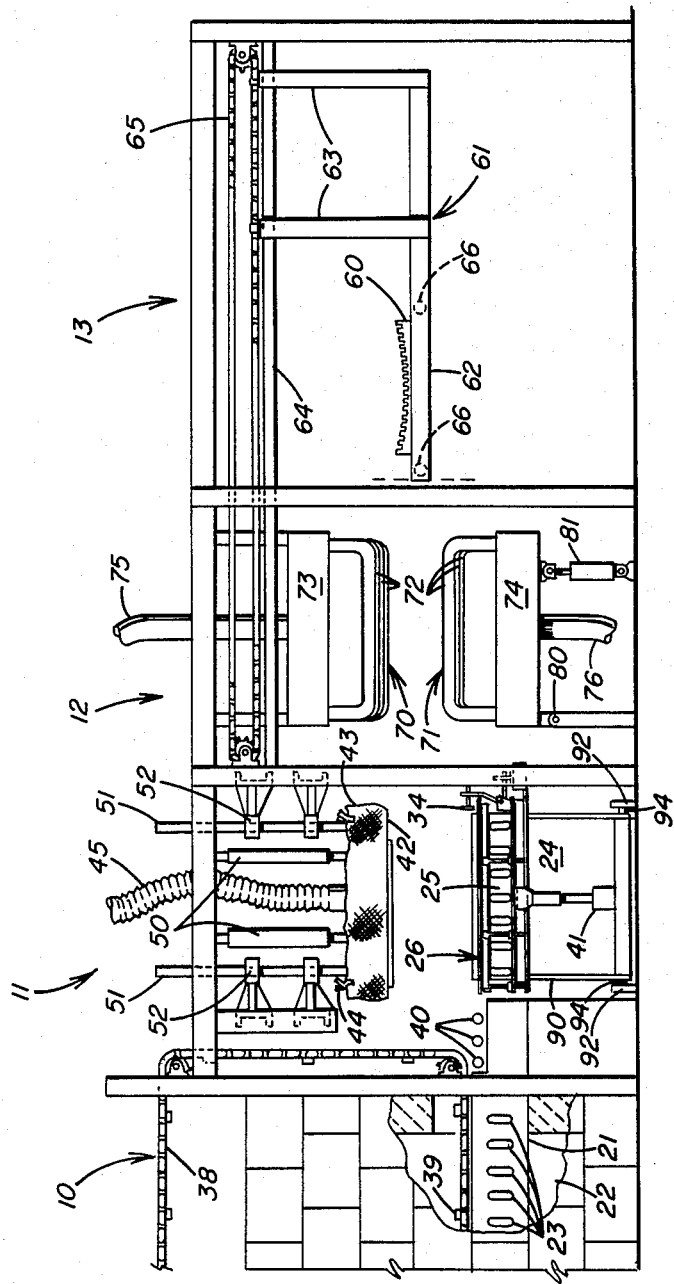
FIG. 1 is a longitudinal elevation of a portion of apparatus conforming to the present invention that performs the method recited herein, said apparatus comprising a shaping station and a cooling station.

Referring to the drawings, a typical apparatus containing the improvement of the present invention comprises a tunnel-like furnace 10 (only the exit end of which is shown), a shaping station 11, a cooling station 12, and an unloading station 13 arranged in consecutive locations along a given path of movement for a series of glass sheets. The path may be along a straight line as shown or may be sharply angled or gently curved between any consecutive stations. The furnace, cooling station and unloading station form no part of the present invention and a description of a specific embodiment described herein is for the purpose of illustration only.

Any arrangement known in the art for heating and tempering a series of horizontally disposed glass sheets may be employed in conjunction with the shaping station of the present invention. Accordingly, only a brief description of the structural details of the furnace, the cooling station and the unloading station will be recited herein. Additional details regarding these elements of apparatus used for shaping horizontally disposed glass sheets may be obtained from U.S. Pat. No. 4,229,199 to Seymour or U.S. Pat. No. 4,252,552 to Frank, the disclosures of which are incorporated herein by reference.

The furnace 10 is preferably of the gas support type depicted in U.S. Pat. No. 3,223,501 to Fredley et al., wherein essentially horizontally oriented sheets of glass are supported on a layer of hot gases and additionally heated by radiant heaters from above, if desired, as they are heated and conveyed through the furnace. However, the present invention may also be used with the type of furnace known as a roller hearth furnace, such as depicted in U.S. Pat. No. 4,252,552 to Frank, in which a series of glass sheets are conveyed over rotating rolls through a heated tunnel-like furnace while heated to a temperature range sufficient for deformation and tempering.

Figure 2:
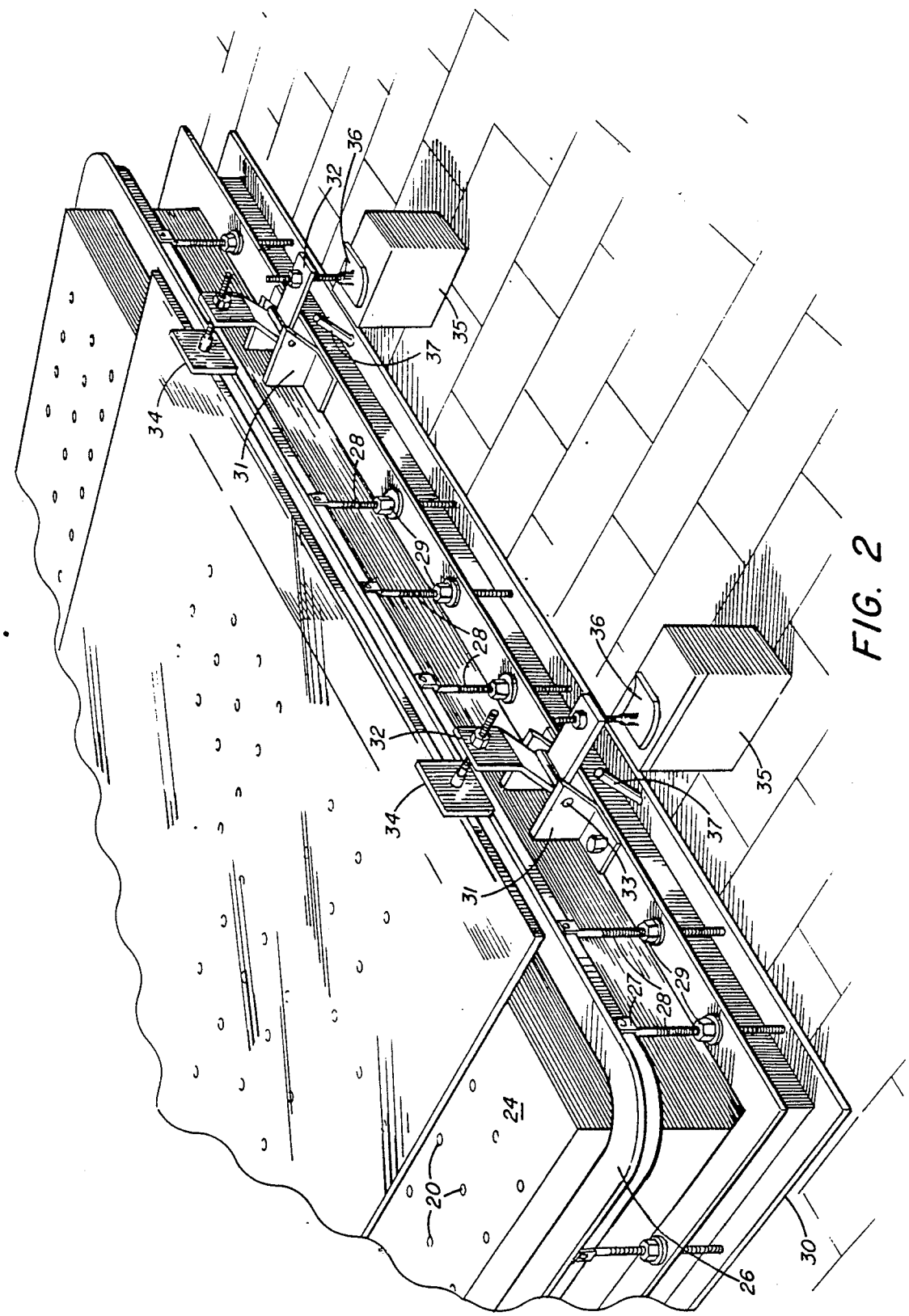
FIG. 2 is an oblique view of a portion of the shaping station of FIG. 1, showing how a ring-like member is constructed to have special stop means in position to engage a glass sheet as the latter moves into a desired position at the glass sheet shaping station while the ring-like member is located below a support surface located at said shaping station.
Figure 3:
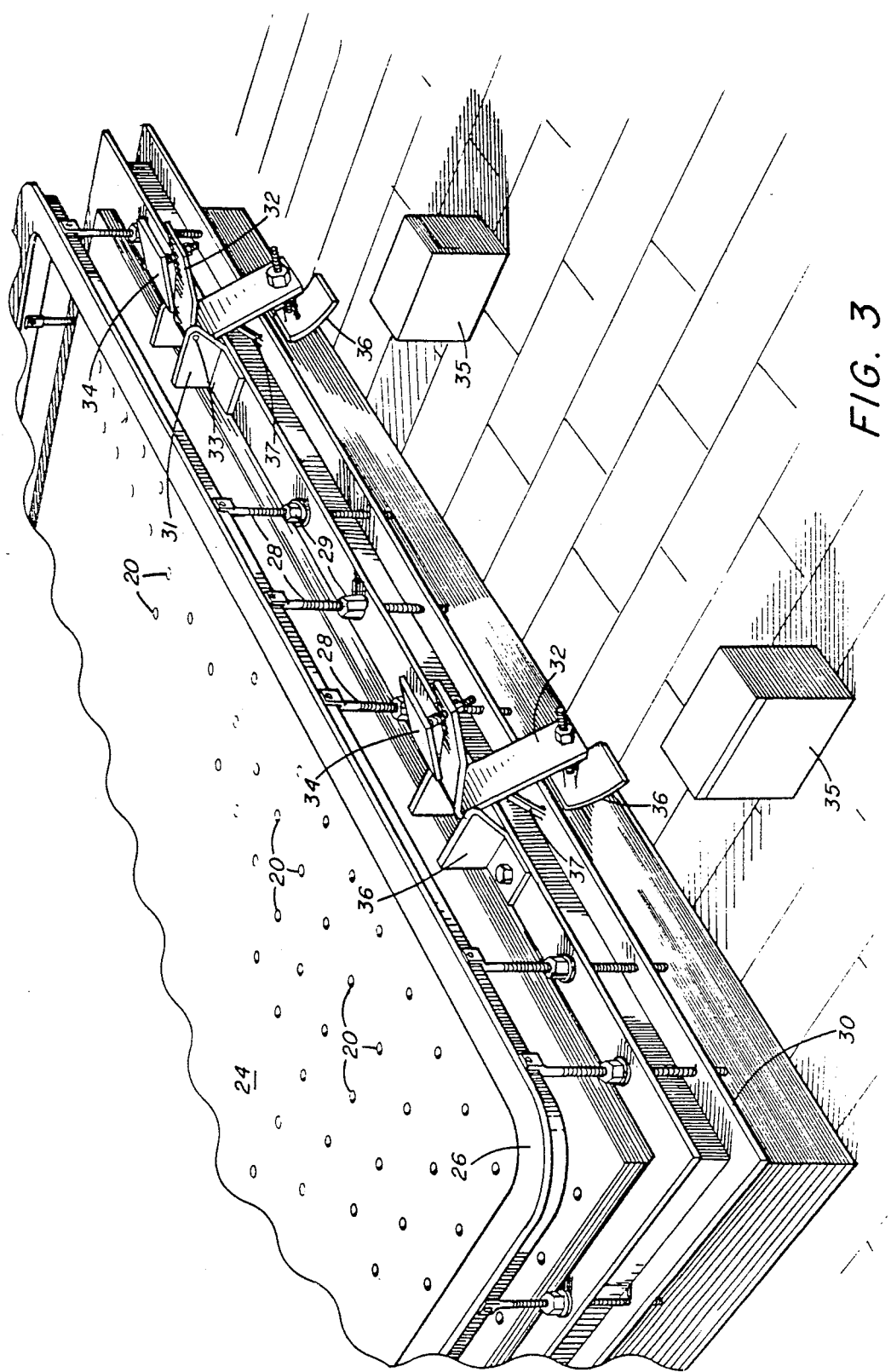
FIG. 3 is a view similar to FIG. 2 taken when the ring-like member is lifted above the level of the support surface and its special stop means has automatically retracted to provide clearance for the shaped glass sheet to move in the direction of its thickness from the support surface to an overhead vacuum holder without its edge rubbing against said special stop means.

In the illustrative embodiment of the present invention, a furnace of the type depicted in U.S. Pat. No. 4,229,199 to Seymour, comprises a gas support bed comprising vertically extending openings 20 for supplying a hot gas blanket over a hearth block 21. (The tops of vertical openings 20 are best seen in FIGS. 2 and 3). Some of these vertical openings extend throughout the thickness of the hearth block 21 and provide a glass sheet support surface for a bed of hot, pressurized gases from a plenum chamber 22. Other vertical openings 20 communicate the top surface of the hearth block with cross bored exhaust passages 23. The hearth block construction terminates at the exit of the furnace.

A gap exists between the furnace hearth block 21 and an auxiliary hot gas plenum chamber 24. The latter supports an auxiliary replaceable support block 25 provided with additional upward openings 20 in the shaping station 11. The auxiliary support block 25 has an outline that conforms generally and is similar to and slightly smaller than the outline of a given production pattern. Auxiliary support block 25 is removably supported on the auxiliary hot gas plenum chamber 24.

A ring-like member 26 has an outline shape that completely surrounds the outline of the shaping station block 25, and conforms to the outline of the production pattern of glass sheets to be shaped at the shaping station. The ring-like member 26 is composed of stainless steel rails covered with or reinforcing a glass engaging member of a suitable heat-insulating refractory composition.

A plurality of tabs 27 are attached in spaced relation around the lower portion of the ring-like member 26. A threaded rod 28 extends downward from the lower end of each tab 27. Adjustment nuts 29 are mounted on each side of at least one of the horizontal flanges of a horizontal frame structure 30 composed of C-shaped channels so as to adjust the vertical position of the ring-like member 26 relative to the horizontal frame structure.

A pair of transversely spaced brackets 31 are mounted to the horizontal frame structure 30 downstream of the downstream edge of the shaping station block 25 as seen clearly in FIGS. 2 and 3. An angular lever arm 32 is pivotally supported on pivot means 33 fixed to each bracket 31. Each angular lever arm 32 supports a glass edge engaging member 34 in adjustable position relative to the upstream end portion of the angular lever arm 32.

A support means 35 is provided downstream of the path of movement taken by the frame structure 30. A shoe 36 is adjustably fixed to the downstream end portion of angular lever arm 32. The upper surface of means 35 is in position to be engaged by the shoe 36. This structure enables shoe 36 to serve as a support means engaging member whenever the frame structure 30 is in a lowered position with the ring-like member 26 below the support surface facing upwardly from the shaping station block 25. An auxiliary stop 37 extends obliquely from the frame 30 to to engage the downstream portion of each lever arm 32, and prevent over rotation of shoes 36 when frame structure 30 rises. This feature enables repetition of the cycle of pivoting the glass engaging members 34 into a glass edge contacting location whenever the ring-like member 26 is lowered to a level below the upper support surface of auxiliary hot gas plenum chamber 24 and into a retracted position whenever the ring-like member is lifted above said upper support surface.

A path is provided for moving glass sheets through the furnace 10 and into the shaping station 11. Conveyor means for moving glass sheets along said path comprises a path of longitudinally extending endless chains 38 between which are connected pusher bars 39. The longitudinal distance between the pusher bars is slightly longer than the transverse dimension of the glass sheets being shaped. One or more rotating conveyor rolls 40 are located in the gap between the downstream end of the furnace hearth block 21 and the shaping station block 25. In this manner, glass sheets are conveyed in series through the furnace 10 and over the conveyor rolls 40 and the shaping station block 25 into position of abutment against the glass engaging members of stop means 34, which are in their raised position near the downstream end portion of the support surface provided on shaping station block 25 to engage the leading edge of a glass sheet when the latter moves into the shaping station 11 for shaping. The raised position of the stop means 34 is mechanically coordinated with the lowered position of ring-like member 26 by support means 35 supporting shoes 36.

Means 41 is operatively connected to horizontal frame structure 30 for lifting and lowering the ring-like member 26 together with said lifting and lowering means 41. The lifting and lowering means 41 may be a pair of pistons or rack and pinion arrangements or the like.

When the sheet arrives into contact with the glass engaging members of stop means 34 of the present invention, the lifting and lowering means 41 are actuated to lift the support means 35, thereby raising the ring-like member 26 from a lowered position beneath the path of conveyance for the flat glass sheets to a raised position in the vicinity of the lower surface of a vacuum holder 42 to be described. The angular lever arm 32 and its attached structure have a center of gravity that is downstream of said pivot means 33 relative to said path. Consequently, when ring-like member 26 rises, the angular lever arm 32 pivots about pivot means 33 in such a direction that shoes 36 remain in contact with the upper surface of support means 35, thereby pivoting stop means 34 in an arcuate path away from the leading edge of the aligned glass sheet. This pivoting continues until lever arms 32 abut auxiliary stops 37.

The vacuum holder 42 is located directly over the shaping station block 25. The vacuum holder 42 comprises a hollow chamber having a bottom plate through which a large number of perforations extend. The bottom plate may be flat if the ring-like member is flat or may be of shaped configuration. Alternatively, the bottom plate of the vacuum holder 42 may be flexible to distort between a flat shape and a curved shape as depicted in U.S. Pat. No. 4,277,276 to Kellar et al., the structural details of which are incorporated herein by reference.

In order to protect the surface of the hot glass sheets, the lower surface of the vacuum holder is covered with a protective cover 43, such as a stretchable knit fiberglass fabric disclosed in U.S. Pat. No. 3,148,968 to Cypher et al, the disclosure of which is incorporated herein by reference. The cover 43 may be held in place by a plurality of clamps 44. The hollow interior of the vacuum holder communicates with a source of vacuum by means of a flexible conduit 45.

The vacuum holder is provided with means for vertical reciprocation such as hydraulic cylinders 50 and guide rods 51 as shown in FIG. 1. The guide rods 51 may slide in fixed annular sleeves 52. The cylinders 50 reciprocate the vacuum holder between a raised position and a lowered position. When the vaccum holder is in a lowered position and the ring-like member 26 is lifted to its raised position, sufficient vacuum is applied to draw the glass sheet into contact with the holder and to be lifted by the vacuum holder as the vacuum holder is raised.

The vacuum holder need not come into contact with the glass sheets in order to pick them up. Merely approaching within 1/32 inch (0.8 millimeter) to about 1/16 inch (1.6 millimeters) has been found sufficient to lift the glass sheets, although this may vary depending upon the amount of vacuum applied and the weight of the glass. Additionally, the amount of vacuum required, the number of perforations in the vacuum holder, and the diameter of the perforations are interdependent. It is desirable to keep the perforations small in number and diameter so as to minimize the power requirement for maintaining a vacuum in the vacuum holder, but there should be enough perforations so that a relatively uniform distribution of the perforations will overlie each portion of the smallest piece of glass to be processed. A spacing of about one perforation per square inch (6.5 square centimeters) has been found to be suitable for most purposes. Perforation diameters larger than 0.075 inch (1.9 millimeters), about 0.090 inch (2.3 millimeters), for example, have been found satisfactory with a vacuum of 4 inches (10 centimeters) water (gauge). These data pertain to the processing of 3 millimeter thick sheets of soda-lime-silica float glass of standard commercial composition.

When one or more glass sheets are held against the holder 42 by vacuum, the vacuum holder 42 is raised so as to leave sufficient clearance to insert an outline shaping mold 60 between the shaping station block 25 and the vacuum holder 42. The shaping mold conforms to the outline and contour required for the bent glass sheets and is preferably of the construction shown in U.S. Pat. No. 3,973,943 to Seymour, the disclosure of which is incorporated herein by reference. The shaping mold is preferably of the outline ring type, light in weight and notched along its upper edge in order to provide minimal interference with the flow of air during the cooling step of a tempering operation.

The shaping mold 60 is carried on a shuttle 61, which carries the shaping mold horizontally through the shaping, cooling and unloading stations. In the specific embodiment illustrated, the shuttle consists of a pair of cantilevered beams 62 supported at one end by vertical braces 63, the upper ends of which are adapted to slide along a pair of horizontal guide rods 64. The means for driving the shuttle 61 along the horizontal path may be provided by way of an electric motor (not shown) driving a continuous chain 65 to which the upper ends of the braces 63 are fixed. Cross braces 66 may support the shaping mold 60 on the shuttle 61.

When the vacuum holder 42 is raised to a height above the elevation of the shaping mold 60, the shuttle is driven to the left as viewed in FIG. 1 so as to bring the shaping mold 60 into direct engagement beneath the sheet of glass engaging the elevated vacuum holder. The uppermost extent of the shaping mold 60 when in position directly beneath the glass sheet is spaced from the glass sheet at a vertical distance greater than the minimum required to clear the glass sheet, so that when the glass sheet is released from the vacuum holder, it will fall a distance onto the shaping mold 60 sufficient to generate a substantial bending force on the glass sheet upon impact.

Release of the glass sheet from the vacuum holder is obtained by reducing the vacuum to an amount insufficient to support the glass sheet thereagainst. This may be accomplished conveniently by opening a valve to bring the interior of the vacuum holder into communication with atmospheric pressure. In some cases it may be desirable to expedite the release of the glass from the holder by following a rapid decay of the vacuum with a rapid buildup to a positive pressure.

Another optional feature is to provide the vacuum holder with a plurality of separately controllable vacuum zones, so that the vacuum may be released non-uniformly. It also may be desirable to apply brief bursts of positive pressure to help release the glass sheet from the vacuum holder.

The momentum imparted to the glass sheet by its free fall onto the shaping mold 60 preferably provides essentially the sole bending force for conforming the glass sheet to the contour of the shaping mold. Although some minor amount of sagging due to the force of gravity may take place after the glass sheet has come to rest on the shaping mold, its magnitude is insignificant relative to the bending produced by the momentum-generated force in the preferred mode of operation. Sagging is a relatively slow process, and in the present invention, tempering is preferably initiated in the minimum amount of time, thereby providing insufficient time for a significant amount of gravity-induced sagging to take place. On the other hand, for some difficult bends it may be desirable to delay the start of tempering so as to permit a significant amount of additional sagging to take place after the glass sheet has dropped onto the mold. Although slower than the preferred mode, such a technique would be considerably faster than gravity sagging alone since the initial dropping of the glass onto the mold would accomplish a substantial part of the bending very quickly.

Upon receiving the glass sheet, the shaping mold 60 is immediately transferred out of the shaping station 11 into the cooling station 12. The cooling station includes upper and lower blast heads 70 and 71, which direct blasts of tempering medium (usually air) onto opposite major surfaces of the glass sheet so as to rapidly cool surface portions of each glass sheet, thereby imparting a temper to the glass sheet. At the cooling station shown in FIG. 1, each blast head includes a plurality of pipe modules 72 having fluid communication at their ends with an upper manifold 73 or a lower manifold 74. Each manifold, in turn, is supplied with pressurized tempering medium through ducts 75 and 76. Each of the pipe modules 72 has a plurality of small orifices oriented so as to direct jets of tempering medium toward the position occupied by a glass sheet conveyed on the shaping mold 60 into the space between the upper and lower blast heads 70 and 71.

The pipe modules 72 may be provided with adjustability in the vertical direction with respect to the manifold 73 or 74 so that more uniform spacing between the glass surfaces and the pipe modules may be provided. The lower blast head 71 may be provided with a hinged support 80 at one end and cylinder means 81 at the opposite end, so as to permit the lower delivery pipes to be tilted when the need arises to clear glass fragments from the blast head.

While blasts of tempering medium are being directed onto the glass sheets in the cooling station, it is preferred to have relative motion between the blast heads 70 and 71 on the one hand and the supported glass sheet on the other hand. This may be carried out by horizontally reciprocating the shuttle means 61 on which the shaping mold 60 and glass sheet are carried.

When tempering is completed, the shuttle means 61 advances to the full right-hand portion of FIG. 1 to bring the glass sheet or sheets into the unloading station 13. There the glass sheets may be removed from the shaping mold by hand or by suitable mechanical means. Typical glass sheet removal means are disclosed in U.S. Pat. No. 4,092,141 to Frank et al and U.S. Pat. No. 4,368,065 to Frank, the disclosures of which are incorporated herein by reference.

The apparatus just described is used in the mass production of shaped, tempered glass sheets of a particular outline to a desired pattern of complicated shape. In order to adjust the apparatus for a change in production pattern, the auxiliary plenum chamber 24 is encased in a metal frame 90. The latter is provided with wheels 92 that ride on transverse tracks 94 to remove the auxiliary plenum chamber 24 and the shaping station block 25 to one side of the shaping station 11. This removal by transverse movement gives an operator access to remove the shaping station block 25 conforming to an outline configuration of one production pattern and to replace it with a shaping station block of the outline configuration of another production pattern. The shaping mold 60 is removed from the shuttle 61 and replaced with a shaping mold for the new production pattern.

A description of a specific embodiment has been made for the sake of illustrating the best mode for practicing the present invention. However, it should be understood that other variations and modifications, such as providing a ring-like member that is flat as well as shaped in elevation in combination with a vacuum holder that is rigidly held in fixed position as well as with a vertically movable vacuum holder, and/or in combination with a vacuum holder defining a flat surface or a curved surface for engaging a glass sheet lifted by said ring-like member, as are known to those skilled in the art, may be resorted to without departing from the spirit and scope of the invention as set forth in the claimed subject matter which follows.

What is claimed is:

1. Apparatus for aligning and lifting a hot glsss sheet at a shaping station comprising means defining a support surface for supporting said glass sheet thereon, a ring-like member, stop means associated with said ring-like member and means for raising and lowering said ring-like member relative to said means defining said support surface between a raised position above said support surface and a lowered position below said support surface, characterized by means mechanically responsive to movement of said ring-like member for mechanically moving said stop means into position near an end portion of said support surface to guide the positioning of an edge surface of said glass sheet thereagainst when said ring-like member occupies said lowered position and for mechanically moving said stop means into position recessed from said support surface when said ring-like member moves in the direction of the thickness of said supported glass sheet to said raised position to avoid edge damage when said ring-like member lifts said glass sheet from said support surface.

2. Apparatus as in claim 1, further characterized by conveyor means for moving said hot glass sheet along a path into said shaping station when said ring-like member occupies its lowered position.

3. Apparatus as in claim 2, further characterized by said support surface being a gaseous bed.

4. Apparatus as in claim 2, further characterized by said support surface comprising a plurality of rolls longitudinally spaced along said path.

5. Apparatus as in claim 2, further characterized by a frame structure connected to said ring-like member for movement therewith, bracket means fixed to said frame structure for movement therewith and provided with pivot means, lever arm means to pivotally mount said stop means to said bracket means, support means, said lever arm means having a center of gravity downstream of said pivot means with respect to said path, a glass engaging member upstream of said pivot means and a support means engaging member downstream of said pivot means, whereby when said ring-like member is in said lowered position below said support surface, said support means supports said support means engaging member to pivot said glass edge engaging member into said desired position to align and position said glass sheet when the latter arrives at said desired position, and, when said ring-like member moves upward above said support surface to lift said glass sheet thereon, said support means engaging member continues to engage said support means and said lever arm means pivots to remove said glass edge engaging member from said desired position mechanically in response to the upward movement of said ring-like member.

6. Apparatus as in claim 2, further characterized by a vacuum holder in essentially vertical alignment with said desired position.

7. Apparatus as in claim 6, further characterized by a frame structure connected to said ring-like member for movement therewith, bracket means fixed to said frame structure for movement therewith and provided with pivot means, lever arm means to pivotally mount said stop means to said bracket means, support means, said lever arm means having a center of gravity downstream of said pivot means with respect to said path, a glass engaging member upstream of said pivot means and a support means engaging member downstream of said pivot means, whereby when said ring-like member is in said lowered position below said support surface, said support means supports said support means engaging member to pivot said glass edge engaging member into said desired position to align and position said glass sheet when the latter arrives at said desired position, and, when said ring-like member moves upward above said support surface to lift said glass sheet thereon said support means engaging member continues to engage said support means and said lever arm means pivots to remove said glass edge engaging member from said desired position mechanically in response to the upward movement of said ring-like member.

* * * * *

UNITED STATES PATENT AND TRADEMARK OFFICE
CERTIFICATE OF CORRECTION

PATENT NO. : 4,488,893

DATED : December 18, 1984

INVENTOR(S) : George R. Claassen, Rudolph A. Karlo, William B. Zimmerman

It is certified that error appears in the above-identified patent and that said Letters Patent is hereby corrected as shown below:

On the cover page, inventor "George B. Claassen" should be
--George R. Claassen--.

Column 8, line 60, "glsss" should be --glass--.

Signed and Sealed this

Twenty-first Day of May 1985

[SEAL]

Attest:

DONALD J. QUIGG

Attesting Officer

Acting Commissioner of Patents and Trademarks